May 3, 1960

C. MOTHIRON 2,935,639

TELEVISION RECEIVER

Filed Oct. 15, 1957

2 Sheets-Sheet 1

INVENTOR
CLAUDE MOTHIRON

BY Frank R. Jifoni
AGENT

INVENTOR
CLAUDE MOTHIRON
BY Frank R. Jifoni
AGENT 2,935,639

TELEVISION RECEIVER

Claude Mothiron, Issy les Moulineaux, France, assignor to North American Philips Company, Inc., New York, N.Y., a corporation of Delaware Application October 15, 1957, Serial No. 690,251
Claims priority, application France October 24, 1956
5 Claims. (Cl. 315—1)

Figure 1:
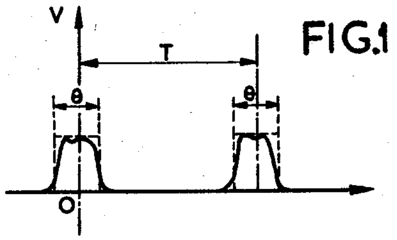

This invention relates to television receivers of the kind comprising means to reduce the interference pulses irradiated by the receiver and disturbing the radio reception in the proximity of the television receiver.

It is known, that a television receiver must comprise a certain number of oscillator circuits to produce oscillations in order to ensure a satisfactory operation, the fundamental frequency and/or given harmonics of these oscillations lying in the medium- or high-frequency range of radio receivers. This applies for example to the deflection voltage generators. Although these members are, usually, incorporated in a cabinet, which serves at the same time as a Faraday screening box, the said oscillations can be irradiated via numerous points of the receiver, and experience has taught that the oscillations emitted by the anode of the image reproducing device (usually a cathode-ray tube), to which a very high voltage is applied, are predominant and may disturb the radio reception in the neighbourhood.

In order to obviate this phenomenon various methods have been proposed, which, however, have proved to be insufficient. For example, it is not sufficient to arrange the television receiver behind an electrostatic screen (Faraday box) owing to the interruption which must be provided in the cabinet to permit the observation of the picture.

The application of an external graphite layer to the cone of the reproducing tube is not sufficient.

The inner coating, to which the very high anode voltage of this member is applied, irradiates the interference pulses which emanate from the anode voltage source and may be produced, for example owing to poor smoothing of this voltage, or the voltages captured by this source mainly from the deflection coils.

The capacitor formed by the surface of the high-voltage anode and that of the external graphite layer and provided to suppress the alternating voltage or pulsatory components at this anode, has most times too low a capacity.

The anode of the image reproducing device (cathode-ray tube) transmits a frequency spectrum which depends upon the shape and the amplitude of the voltage applied to this electrode. Experience shows that, most times at least a few frequencies of this spectrum disturb seriously the reception of radio waves, in spite of all precautions taken hitherto with respect to screening of the receiver cabinet. This disturbing phenomenon occurs the more strongly according as the size of the picture tube and hence that of the image is larger.

In contradistinction to the practical impossibility to suppress these interference oscillations the present invention provides means to modify the spectrum of these radiations and, more particularly:

(*a*) To limit the amplitude and the width, (*b*) To transfer the radiations to a frequency range not employed for radio-transmission, (*c*) To obtain these two results simultaneously.

The receiver according to the invention has the feature that the circuit comprising the said electrode is coupled with an acceptor circuit, a rejector-circuit and/or a damping circuit to suppress or attenuate given frequencies contained in the radiation spectrum.

The invention will now be described more fully with reference to the accompanying drawing.

Whereas Figs. 1, 2, 4 and 5 are shown for explanation purposes and

Figs. 3, 6, 7, 8 and 9 show used circuits and elements,

Fig. 1 illustrates, as a function of time, the voltage applied to the high-voltage anode of the image reproducing tube of a television receiver. This voltage consists, for example, of a sequence of comparatively short pulses, having a period T and has approximately the waveform indicated in broken lines. Theoretically this voltage contains all frequencies that are a multiple of 1/T. It may be assumed (and experience confirms it) that the virtual pulses, indicated by full lines, contain a large number of these frequencies (having different amplitudes) and hence frequencies lying in the range of radio transmission (it being assumed that the value 1/T is equal to the line scan frequency, this value is, at a maximum about 20,000 c./s. with the present-day television standard, whilst the frequencies of radio transmission exceed 150,000 c./s.).

Figure 2:
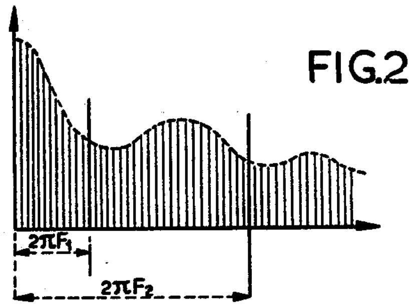
Figure 3:
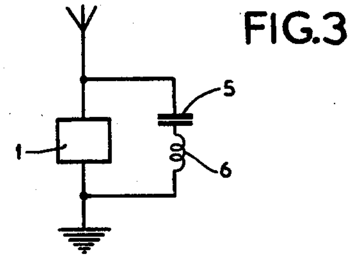

Fig. 2 shows the frequency spectrum corresponding to the pulses illustrated in Fig. 1. In this figure the frequency range of radio transmission lies, for example, between $F_1$ and $F_2$. Consequently, this band is to be removed as far as possible from the spectrum shown.

Figure 4:
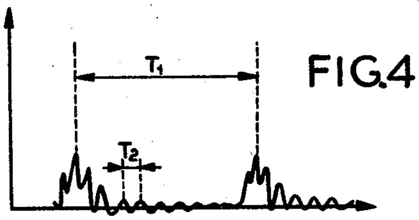
Figure 5:
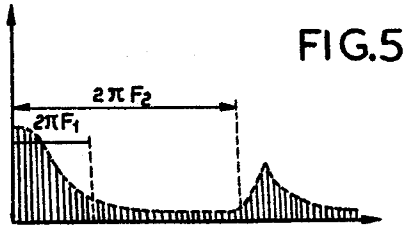

If, in accordance with the invention, an acceptor circuit 5, 6 (and/or damping circuit) which allows particularly the frequencies between $F_1$ and $F_2$ to pass, is connected in parallel between the mass of the receiver and the anode 1 of the image reproducing tube, the waveform of the voltage pulses applied to the anode (shown in Fig. 1) is modified and rendered equal, for example, to that shown in Fig. 4. It is evident from this figure that the voltage at the anode, after the provision of the acceptor circuit, assumes a sinusoidal waveform (in spite of random deviations produced by the first harmonics). The principal frequencies are $1/T_1$ and $1/T_2$ (fundamental frequency and only a few of the first harmonics). Fig. 5 shows the corresponding frequency spectrum; it is evident therefrom that the frequencies lying in the interval between $F_1$ and $F_2$ have disappeared or that their amplitude has been materially reduced.

Figure 6:
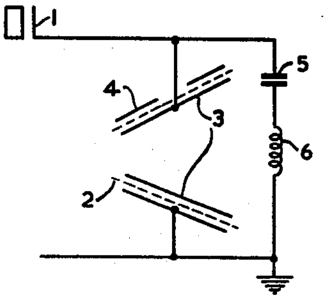

One embodiment of the acceptor circuit according to the invention is shown diagrammatically in Fig. 6. In this figure the high-voltage anode of the image reproducing tube 2 is designated by 1. The conductive coating 3 inside this tube is connected to the anode 1, whereas the external graphite layer 4 is connected to earth. The two coatings 3 and 4 together with the glass wall of the tube 2 (usually 2 is a glass tube) as a dielectric, constitute a capacitor, the capacity of which is, however most times insufficient for the suppression of the unwanted frequencies. The acceptor circuit between the anode 1 and earth is formed by a capacitor 5, of which one terminal is connected directly to this anode in the nearest possible proximity thereof, in series with an inductor 6. This circuit constitutes a tuned series circuit, of which the tuning frequency lies between $F_1$ and $F_2$.

Figure 7:
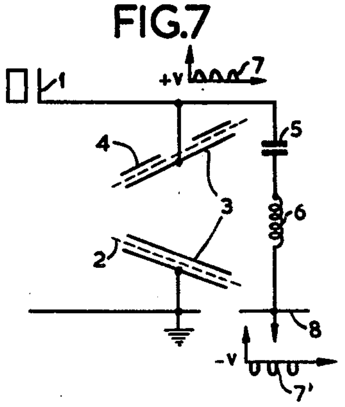

A variant of this embodiment shown in Fig. 7 consists in that the acceptor circuit 5, 6 is connected between the high-voltage of the image reproducing tube, at which the voltage pulses 7 occur, and a conductor 8 which conveys a voltage equal to the voltage applied to the anode, having, however, opposite polarity, so that the pulses 7' have the same amplitude but opposite polarity.

Figure 8:
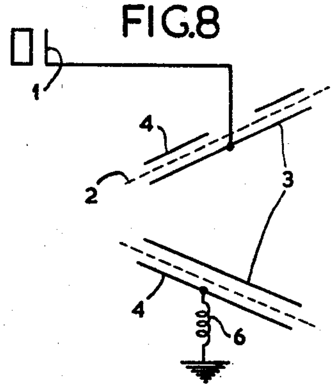
Figure 8A:
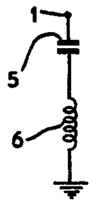

If the capacity formed by the conductive coatings 3 and 4 on the inner and outer walls of the tube 2 is sufficiently high, a further variant consists in that this capacity is used as a capacitor for the acceptor circuit. In this case a device as shown in Fig. 8 is obtained; Fig. 8*a* shows the substitute diagram; with this device the graphite layer 4 of the tube 2 is connected to earth via the inductor 6.

Figure 9:
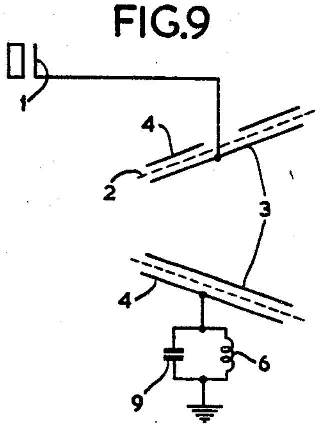
Figure 9A:
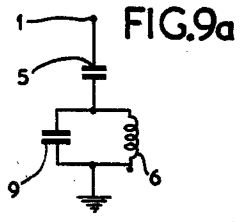

A further embodiment of the invention consists in that the capacitor of the acceptor-circuit is connected to earth via a tuned parallel circuit, as is shown in Figs. 9 and 9*a*. In Fig. 9 the capacitor 5, similarly to the case of the preceding variant, is formed by the conductive coatings 3 and 4 of the tube 2. The external graphite layer 4 of this tube is connected to earth via the inductor 6, which is shunted by a capacitor 9. Fig. 9*a* shows the substitute diagram of this device in a more general sense, since with the first-mentioned device the value of the capacitor 5 is determined by the construction of the tube 2, whereas in the second device this value is arbitary. These two devices have, at any rate, two tuning frequencies: $f_0$ for the tuning of the series circuit 5, 6 and $f'_0$ for the tuning of the parallel circuit 6, 9. These two frequencies may lie in the range between the frequencies $F_1$ and $F_2$, referred to above or lie in the proximity of one of these frequencies in accordance with the local conditions of radio reception.

It is obvious that modifications of the embodiments described above are possible within the scope of the invention, for example by replacing parts by technically equivalent components.

As stated above, the acceptor circuit may comprise resistors to dissipate the energy of the frequencies to be suppressed. Moreover, the said circuit may comprise a certain number of such elements which have equal or unequal values and which are operative each in a given frequency range or may constitute a suitable filter.

What is claimed is:

1. A television receiver circuit comprising an image reproducing device having a high-voltage anode, a high-voltage source connected to apply high voltage to said anode thereby tending to cause said anode to radiate an undesired radiation spectrum, and a resonant circuit connected to said anode and tuned to a frequency so as to attenuate frequencies of said undesired radiation spectrum, said resonant circuit comprising a capacitor and an inductor connected in series between said anode and a point of reference potential.

2. A television receiver circuit comprising an image reproducing device having a high-voltage anode, a high-voltage source connected to apply high voltage to said anode thereby tending to cause said anode to radiate an undesired radiation spectrum, and a resonant circuit connected to said anode and tuned to a frequency so as to attenuate frequencies of said undesired radiation spectrum, said resonant circuit comprising a capacitor and an inductor connected in series between said anode and electrical ground.

3. A television receiver circuit comprising an image reproducing device having a high-voltage anode, a high-voltage source connected to apply high voltage to said anode thereby tending to cause said anode to radiate an undesired radiation spectrum, a source of voltage having an equal value and opposite polarity with respect to said high voltage, and a resonant circuit comprising a capacitor and an inductor connected in series between said anode and said source of voltage, said resonant circuit being tuned to a frequency so as to attenuate frequencies of said undesired radiation spectrum.

4. A television receiver circuit comprising an image reproducing device having a high-voltage anode and an electrode positioned to form a capacitance in cooperation with said anode, a high-voltage source connected to apply high voltage to said anode thereby tending to cause said anode to radiate an undesired radiation spectrum, and an inductor connected between said electrode and a point of reference potential, said inductor and said capacitance providing a resonant circuit tuned to a frequency so as to attenuate frequencies of said undesired radiation spectrum.

5. A television receiver circuit comprising an image reproducing device having a high-voltage anode and an electrode positioned to form a capacitance in cooperation with said anode, a high-voltage source connected to apply high voltage to said anode thereby tending to cause said anode to radiate an undesired radiation spectrum, and a capacitor and an inductor connected in parallel combination between said electrode and a point of reference potential thereby to form a resonant circuit in combination with said capacitance, said resonant circuit being tuned to a frequency so as to attenuate frequencies of said undesired radiation spectrum.

References Cited in the file of this patent

UNITED STATES PATENTS

| | | |
|---|---|---|
| 2,668,911 | Schlesinger | Feb. 9, 1954 |
| 2,721,995 | Friend | Oct. 25, 1955 |
| 2,726,340 | Nelson | Dec. 6, 1955 |
| 2,829,292 | De Vere Krause | Apr. 1, 1958 |
| 2,833,961 | Thalner | May 6, 1958 |

FOREIGN PATENTS

| | | |
|---|---|---|
| 873,534 | France | July 10, 1942 |